July 18, 1939.  W. P. WANNEMACHER  2,166,454
ANTISKID DEVICE
Filed March 17, 1936  3 Sheets—Sheet 1

Inventor
William P. Wannemacher

By Joseph Charles Walter
Attorney

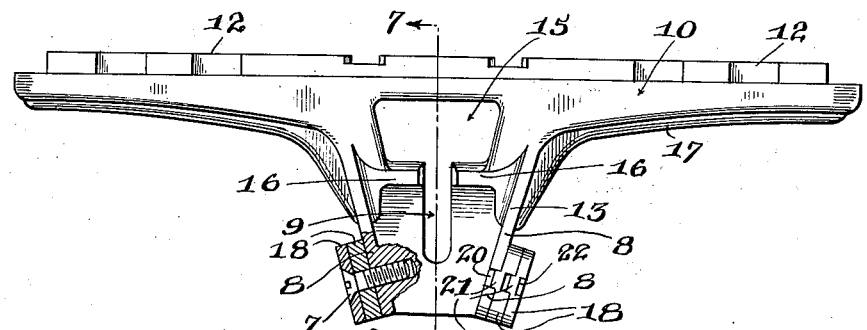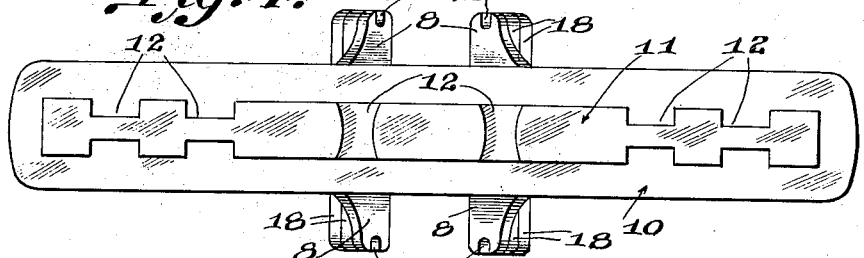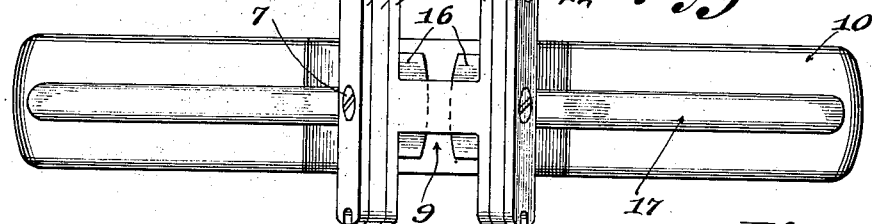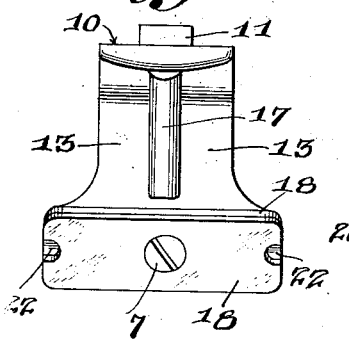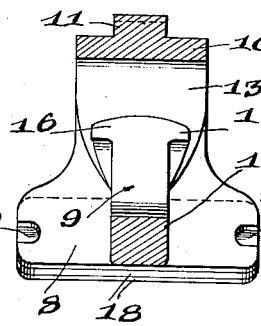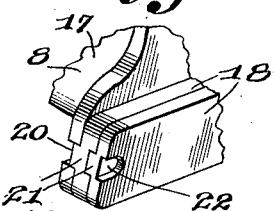

July 18, 1939.  W. P. WANNEMACHER  2,166,454
ANTISKID DEVICE
Filed March 17, 1936    3 Sheets—Sheet 3

Inventor
William P. Wannemacher

By Joseph Charles Walter
Attorney

Patented July 18, 1939

2,166,454

UNITED STATES PATENT OFFICE 2,166,454

ANTISKID DEVICE

William P. Wannemacher, Bloomington, Ill.

Application March 17, 1936, Serial No. 69,379

4 Claims. (Cl. 152—220)

My invention relates to anti-skid devices, and more particularly to that class of devices which are applicable to the wheels of a motor vehicle which embody two or more tires on a single wheel in exertion of a tractive or braking effort.

An object of my invention is to provide a device in the form of a lug which may be used in single or plural form in combination with a chain which will promote the tractive effort of a vehicle under abnormal road conditions occasioned by ice, snow, or an unsatisfactory road surface condition, wherein the use of tires alone would not provide a sufficient tractive or braking effort.

A further object of my invention is to provide one or more traction or braking lugs which will serve not only to increase the tractive or braking effort of the wheel to which it is applied, but which will maintain its selected position in respect to the periphery of the tire to which it is applied.

Furthermore, and as hereinafter more fully pointed out, the arrangement of my invention is such that each individual lug, and especially where a plurality of lugs are used, will maintain a selected angular position in respect to the wheel or tire surface.

Further provision is made, and the lugs are so designed, that it is unnecessary to raise or jack the vehicle to apply the lugs. They may be readily applied while the vehicle is standing at rest and in normal operating position, and in so doing a minimum of effort and time is involved.

Specific details of my invention will be hereinafter more fully described in reference to the accompanying drawings wherein:

Fig. 3 is a side view partially in section showing in detail one of the lugs.

Fig. 4 is a plan view of Fig. 3.

Fig. 5 is a bottom plan view of Figs. 3 and 4.

Fig. 6 is an end view of the lug.

Fig. 7 is a section taken on the line 7—7 of Fig. 3.

Figs. 8 and 9 are perspective views illustrating the details of the shims or filler strips hereinafter described.

Figure 2:
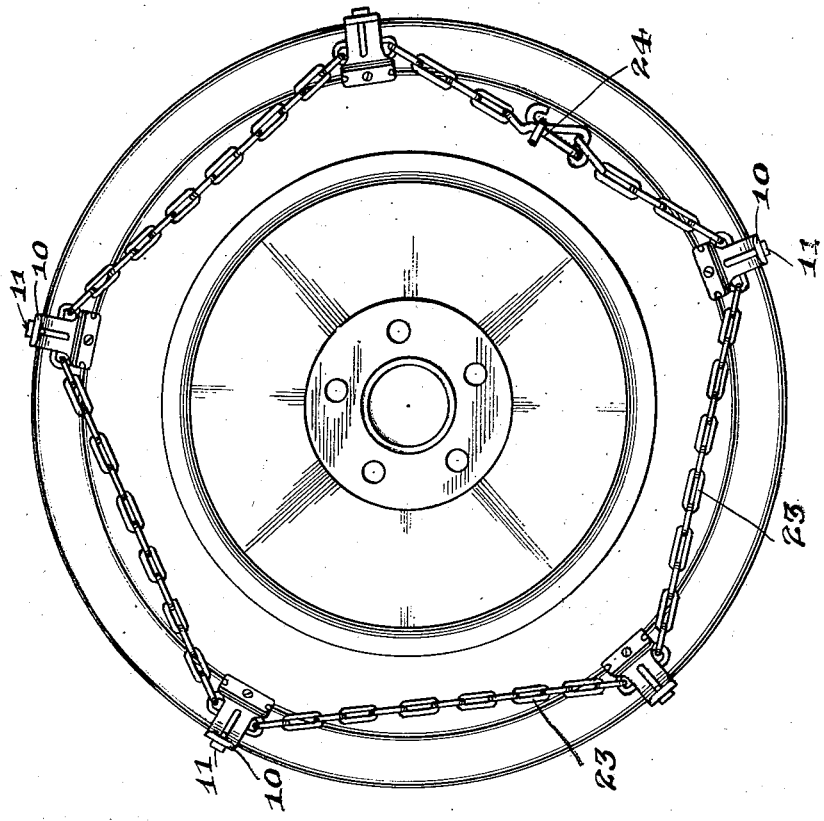
Fig. 2 is a side view of the construction taken at 90° from Fig. 1.

As hereinbefore pointed out, my invention contemplates the use of one or more lugs having a work or road-engaging surface and adapted to be positioned transversely of a plurality of tires. The number of lugs or their angular relationship, one with respect to the other, is of no particular importance except to the extent that the greater the number of lugs, the greater the tractive or braking effort will be.

My invention will be described particularly with respect to one lug, since a plurality of lugs adapted to a particular wheel construction will be duplicated.

The lugs comprise a horizontal plate 10 which is designed to overlie transversely two or more tires fixed to a wheel. As shown in Figs. 3 and 4, the upper surface or road-engaging surface of the plate 10 carries an outwardly or upwardly extending rib 11 which is designed primarily to increase the tractive effort of the plate 10 and to prevent side skidding by virtue of the recesses 12 formed therein.

The outer portion of the lug, for example the plate 10 and rib 11, is preferably tempered or hardened in order to minimize undue wear upon the lug due to road conditions. The lower or radially inward portions of the lug may be of softer material in order to better withstand sudden shock and road conditions under the tractive or braking effort of the vehicle.

The under surface of the plate 10 adjacent the central portion thereof is turned downwardly or radially inward to form the flanges 13. The flanges 13 are connected by a transverse web 14. The design of the plate 10, the flanges 13 and the web 14 is such that an opening 15 is provided as shown in Fig. 3. This opening 15 may be rectangular, circular or otherwise formed, so that the links of a chain, whether they occupy a horizontal, vertical or intermediate position, will readily pass therethrough.

The web 14 is slotted or bifurcated as at 9 so that the upper end thereof enters the opening 15. The thickness of the web 14 should be such as to withstand all abnormal stresses imposed thereon due to the tractive or braking efforts of the vehicle. It should be clear that when a vehicle is in forward motion the curved portion of the succeeding horizontal link engages one surface of the web 14. When braking or reversing conditions are applied to the vehicle then the preceding link occupying a horizontal position in respect to the link occupying the slot will engage the opposite surface of the web 14.

Transverse flanges 16 are provided at the upper end of the web 14 which extend toward one another from the flanges 13 to the edge of the slot 9. Webs 17 extend along the inner or under surface of the plate 10 and continue downwardly along the outer surfaces of the flange 13 for the purpose of reinforcing these parts and to obtain sufficient frictional contact with the surface of the tires due to engagement therewith and the resiliency thereof.

As hereinbefore explained, the area of the opening 15 should be such that a chain of sufficient size or strength may pass therethrough regardless of the position of the individual links. The depth of the slot 9 should be such as to receive a link of the chain in vertical position, i. e., perpendicular to the axis of rotation of the tire, the next preceding and succeeding link, which occupies a substantially horizontal position, abutting the forward or rearward surface of the web 14 immediately beneath the transverse flanges 16, according to the tractive or braking effort.

With the construction of the several parts as herein described, it will be seen that when a chain link in vertical position occupies the slot 9, the preceding and succeeding link which occupies a horizontal position will serve to position a lug in a selected position wherein the lug can have a circumferential motion to an extent equal only to the effective length of the vertical link since additional circumferential motion will be limited in case of tractive or braking efforts by the preceding or succeeding horizontal links. The curved portions of the preceding and succeeding horizontal links of the chain in conjunction with the web 14 will act as stops or limiting members which restrict any marked rotational movement of the lug in respect to the tire.

Dual or plural tires vary in outside diameter as well as in transverse section. The distance between individual tires on a single wheel also varies. In order to accommodate my invention to tires of varying diameter and transverse cross section, as well as varying spacing, the lower or inwardly projecting flanges 13 are provided with oppositely spaced lugs 8, extending in a plane parallel to the plane of rotation of the wheel, arranged to receive one or more shims or filler strips 18. One or more of these shims 18 are adapted to be affixed by screws or other suitable means 7 to the outer surface of the lugs 8, as indicated in Fig. 3. These shims are provided for the purpose of substantially filling the space between adjacent tires should the outer surfaces of the lugs 8 formed on the inner end of the flanges 13 be insufficient to accomplish this purpose. Preferably the space between the tires should be filled by the flanges 13 per se or by the use of one or more shims or plates 18 so that a frictional engagement will be obtained between the flanges 13 carrying the shims, if necessary, and the inwardly curved portions of adjacent tires. This construction will prevent any side motion of the lug in a plane parallel to the rotation of the wheel as well as preventing any substantial twisting or angular motion of the lug in respect to the tires.

For the purpose of accommodating the shims 18, the lower part of the flange 13 formed into the lugs 8 is provided with keys or key ways 20. One or more shims of substantially flat form will be provided and each will have a portion thereof formed with a lug or key 21 on one surface, the opposite surface of the shim being provided with a recess 22. The lug of the shim which engages the surface of the flange 13 will engage the recess or key formed therein. If additional shims are used, the lugs will engage the recess 22 of the first shim, and so on in ad infinitum, according to the number of shims used.

In applying my invention to a wheel carrying dual or plural types of tires, an individual lug is placed in a selected position. The retaining chain 23 is passed or threaded through the opening 15 of the lug which is of sufficient size to pass the links of the chain therethrough regardless of their positions. Succeeding lugs are placed in the desired or selected positions and the chain passed through their openings 15. When the desired number of lugs has been placed about the periphery of the wheel, the ends of the chain are locked or connected together by the chain connection 24.

Figure 1:
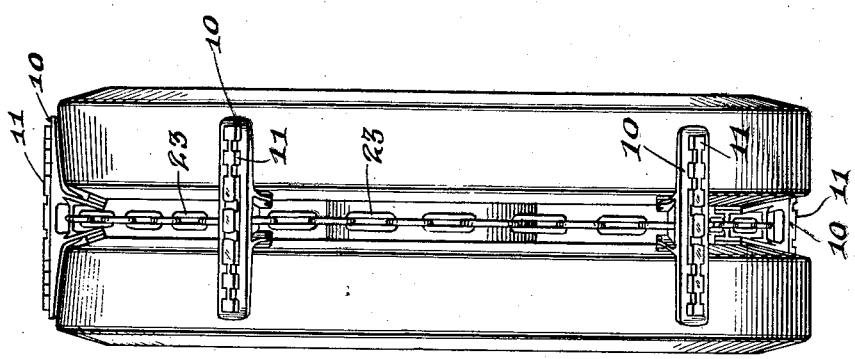
Figure 1 is an end view showing the application of my invention to a dual or plural tire, illustrated at right angles to the axis of rotation of the wheel.
Figure 10:
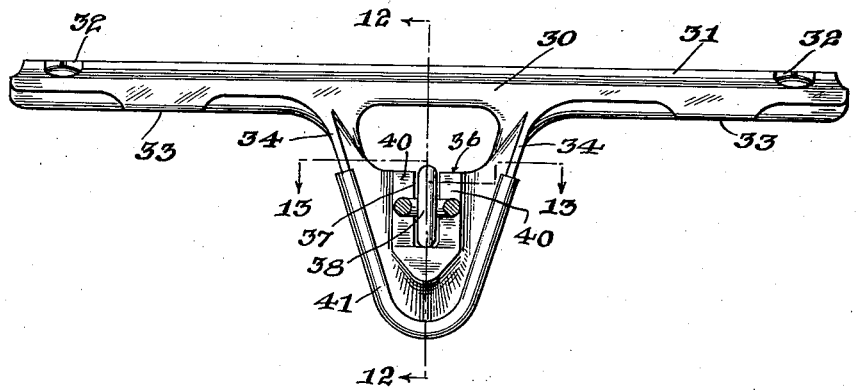
Fig. 10 is a side view of a slightly modified form of my invention.
Figure 11:
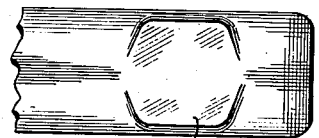
Fig. 11 is a bottom plan view of a portion of the underside of the plate which engages or rests upon the tires.
Figure 12:
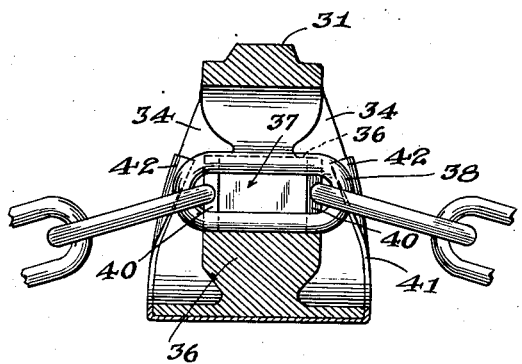
Fig. 12 is a section on the lines 12—12 of Fig. 10.
Figure 13:
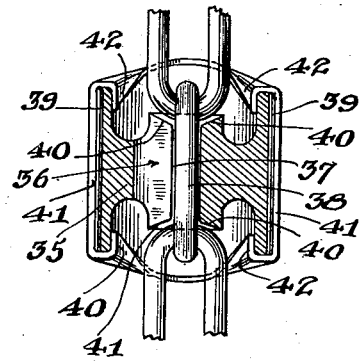
Fig. 13 is a section on the lines 13—13 of Fig. 10.

As hereinbefore described, due to a vertical link of the chain occupying the slot 9, and the preceding and succeeding links occupying a horizontal position and underlying the transverse flanges 16, rotational movement of the lugs in respect to the tire surface will be practically negligible, and in any event, limited by the shoulders or curved portion of the preceding and succeeding horizontal links of the chain. The vertical link of the chain is maintained against outward or radial movement in respect to the slot 9 since the transverse flanges 16 engage the upper surface of the vertical link and prevent its displacement outwardly, the chain 23 serving to hold one or more of the lugs in the selected position and occupying the space or recess between the tires, as shown in Figure 1.

A slightly modified form of my invention is shown in Figures 10 to 13. In this construction the plate 30 is provided with a road-engaging rib 31 which may be fashioned or provided with recesses as at 32 to prevent side skidding. The under surface of the plate 31 is formed with flattened portions on bosses 33 which engage the tread of the tire.

The under surface of the plate 30 adjacent the central portion thereof is turned downwardly or radially inward to form the flanges 34. The flanges 34 are connected by a web 35 having a centrally enlarged portion 36 extending longitudinally in the plane of revolution of the wheel.

The enlarged portion 36 is slotted longitudinally as at 37 to receive a link of a chain 38 when said link occupies a vertical position. Inclined shoulders 40 are provided at opposite sides of the web and adjacent the slot 37 so as to provide a bearing surface for preceding and succeeding links to the one occupying the slot 37, said preceding and succeeding links normally occupying a position at an angle to the link resting in the slot 37. The inclined shoulders 40 are preferably arranged to conform with or occupy a position tangentially to the curvature of the horizontal links.

As previously described dual or plural tires vary in outside diameter as well as in transverse section. Instead of using one or more shims 18 with the key and screw connections, as previously described, there may be provided a filler sheet 41 of relatively flexible material having inturned edges 42 adapted to engage the edges and side walls of the inclined flanges 34, see Figures 10 and 13. This filler sheet 41 may be supplemented by one or more shims 39 placed between the inside surface of the filler sheet 41 and the outer surface of the flange 34. Thus there is provided a means whereby lugs of definite dimensions, within reasonable limits, may be applied to dual tires where the spacing thereof may vary and at the same time maintain the lug in a position substantially at right angles to the plane of revolution of the wheel. In other words, by use of the filler sheet 41 and one or more shims 42 the lug can be maintained, within reasonable limits in a desired position and unaffected by any twisting motion which would impair the efficiency thereof.

Inasmuch as the surfaces of the filler sheet 41 is inclined to an extent substantially equal to the surfaces of the inclined flanges 34, it will be apparent that the filler sheets 41 may be readily removed from the lug if and when desired.

The thickness of the enlarged portion 36 in the plane of revolution of the wheel and the formation of inclined shoulders 40 thereon should be such as to provide a reasonable tolerance for the reception of links of chain of varying specifications, bearing in mind meanwhile that the closer the tolerance of the width of the web, the less there will be any tendency of the lug to "back-lash" under tractive or braking efforts as the case may be.

I claim:

1. In an anti-skid device for plural spaced tires mounted on a single wheel, the combination with a chain adapted to normally be disposed within the space between said tires, a lug comprising a plate adapted to be positioned at substantially right angles to the plane of revolution of the tires, flanges projecting inwardly from said plate, a web connecting said flanges and provided with an opening to receive said chain, the opposite walls of said web and the opening therein serving to hold the lug in a selected position without any substantial change thereto under tractive and braking efforts, and one or more shims adapted to be added to the outer surfaces of the flanges to occupy the space between adjacent tires whereby to minimize a twisting of the lug in respect to the tires.

2. In an anti-skid device for plural spaced tires mounted on a single wheel, the combination with a chain adapted to normally be disposed within the space between said tires, a lug comprising a plate adapted to be positioned at substantially right angles to the plane of revolution of the tires, flanges projecting inwardly from said plate, a web connecting said flanges and provided with an opening to receive said chain, the opposite walls of said web and the opening therein serving to hold the lug in a selected position without any substantial change thereto under tractive and braking efforts, one or more shims adapted to be added to the outer surfaces of the flanges to occupy the space between adjacent tires whereby to minimize a twisting of the lug in respect to the tires, and means for maintaining said shims against movement in respect to said flanges.

3. In an anti-skid device for plural spaced tires mounted on a single wheel, the combination of a chain located between said tires, a lug adapted to be engaged by said chain, said lug comprising a transverse plate adapted to engage the surface of the road, flanges projecting inwardly from said plate and arranged to engage the inwardly turned walls of said tires in a manner to prevent lateral and twisting motion of said lug, said flanges being connected by a web provided with an opening of sufficient area to accommodate said chain regardless of the position of the links thereof, said web also being provided with a slot extending radially inwardly of said opening to accommodate a link of said chain when occupying a plane parallel to the plane of rotation of the wheel and at substantially right angles to preceding and succeeding links, the location of the opening and slot in the lug being such that one or more lugs will be maintained by the chain in substantially the selected angular position with respect to the wheel.

4. In an anti-skid device for plural spaced tires mounted on a single wheel, the combination of a chain located between said tires and radially inwardly of the surface thereof, a lug adapted to be engaged by said chain, said lug comprising a transverse plate adapted to engage the surface of the road, flanges projecting inwardly from said plate and arranged to engage the inwardly turned walls of said tires, webs connecting the plate and the inwardly turned flanges for strengthening the plate and flanges and adapted to engage the inwardly turned walls of adjacent tires, a web connecting said flanges and provided with an opening of sufficient area to accommodate said chain regardless of the position of the links thereof, said web also being provided with a slot extending radially inwardly of said opening to accommodate a link of said chain when occupying a plane parallel to the plane of rotation of the wheel and at substantially right angles to preceding and succeeding links, the location of the opening and the slot in the lug being such that one or more lugs will be maintained by the chain in substantially the selected angular position with respect to the wheels.

WILLIAM P. WANNEMACHER.